United States Patent [19]

Brown

[11] 4,441,319
[45] Apr. 10, 1984

[54] BRAKE BOOSTER

[75] Inventor: Arthur K. Brown, South Bend, Ind.

[73] Assignee: The Bendix Corporation, Southfield, Mich.

[21] Appl. No.: 413,866

[22] Filed: Sep. 1, 1982

[51] Int. Cl.³ .................................... B60T 13/12
[52] U.S. Cl. ................................ 60/548; 60/552; 60/562
[58] Field of Search .............. 60/547.1, 548, 552, 60/562

[56] References Cited

U.S. PATENT DOCUMENTS 3,572,850  7/1968  Schultz ............................ 137/625
3,889,467  6/1975  Huffman et al. ..................... 60/548

Primary Examiner—Robert E. Garrett
Assistant Examiner—Scott L. Moritz
Attorney, Agent, or Firm—Paul David Schoenle; Ken C. Decker

[57] ABSTRACT

A brake booster is provided with a housing (30) having a bore (32) therein receiving a piston (52) carrying a valve assembly (68). An end plug (50) cooperates with the piston (52) to form a work chamber (66) and an input member (84) extends through the end plug to cooperate with the valve assembly (68). In the rest position, the work chamber (66) communicates with a reservoir (38) via passage 112, auxiliary chamber 104, passage 116, bore 32 and passage (40) independently of the piston (52).

10 Claims, 1 Drawing Figure

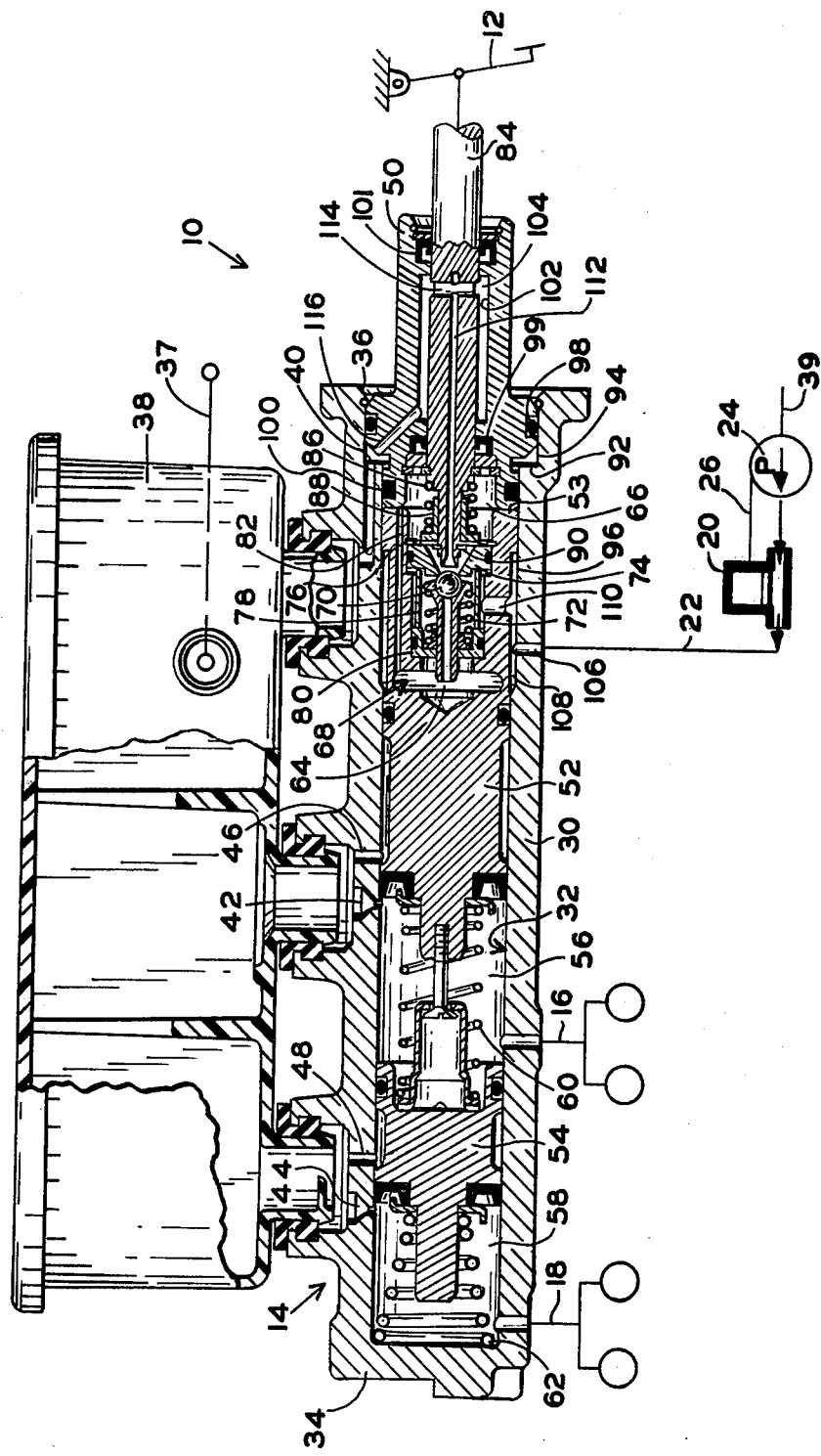

BRAKE BOOSTER

This invention relates to a brake booster which utilizes fluid pressure from a remote fluid pressure source during a brake application to provide an assist for a vehicle operator.

A brake booster having a housing with a bore therein, a piston movably disposed within the bore and cooperating therewith to partially define a pressure chamber communicating with a brake circuit and with a reservoir in a rest position, a valve assembly carried by the piston to move therewith within the bore, an end plug substantially closing one end of the bore and cooperating with the piston to define a work chamber therebetween, and an input member extending through the end plug to cooperate with the valve assembly, the input member being normally spaced from the valve assembly in the rest position and engageable therewith in an actuated position to open the valve assembly to communicate fluid pressure to the work chamber whereby the piston is moved to generate fluid pressure in the pressure chamber for communication with the brake circuit.

In U.S. Pat. No. 3,572,850, a brake booster is provided with a housing movably carrying a piston within a housing bore. An input member extends through an end plug to cooperate with a valve assembly within the piston. During braking, fluid pressure is communicated directly to a first brake circuit via a first pressure chamber and a floating piston is movable in response to the fluid pressure in the first pressure chamber to communicate fluid pressure to a second brake circuit. The piston remains stationary within the housing bore so that the input member travel is less than the travel of the floating piston. Consequently, a vehicle operator does not experience a direct relation between increased pedal travel and increased braking.

It is known that the above-described brake booster can be provided with a "full stroke" so that the input member valve assembly and piston will move during a brake application to require a vehicle operator to increase pedal travel for increased braking. However, such brake boosters directly communicate the pressure source with one brake circuit so that a failure in the one brake circuit prevents a power assist for another brake circuit. In addition, such "full stroke" brake boosters are separately designed from a master cylinder so that integration of parts is lacking, thereby resulting in many parts—when fewer parts will provide a simpler booster.

The present invention is characterized by said input member cooperating with said end plug to define an auxiliary chamber, said input member including a first passage communicating the work chamber with the auxiliary chamber in the rest position, said end plug including a second passage communicating the auxiliary chamber with said housing bore, said housing including a third passage extending from said housing bore to said reservoir to communicate said work chamber with said reservoir in the rest position via said first, second and third passages, and said end plug including a first pair of sealing rings on opposite sides of said second passage cooperating with said housing bore whereby the communication from said work chamber to said reservoir is independent of said piston.

It is an advantage of the present invention that a primary piston is adapted to carry a valve assembly which moves with the piston and an end plug cooperates with the primary piston to form a work chamber. The work chamber communicates with a reservoir in the rest position in the absence of fluid paths required in the primary piston.

The invention will now be described with reference to the accompanying drawing which schematically illustrates a vehicle brake system with a brake booster constructed according to the present invention shown in cross-section.

A brake system 10 includes a brake pedal 12 operatively connected to a brake booster 14 and pair of brake circuits 16 and 18 communicating with the brake booster 14. An accumulator 20 stores fluid pressure which communicates via conduit 22 with the brake booster 14 while a pump 24 is selectively operable to maintain a predetermined pressure level within the accumulator 22 via feedback means 26.

The brake booster 14 includes a housing 30 with a bore 32 extending from an end wall 34 to an opening 36. A reservoir 38 is connected to the housing 30 for communication with the bore 32 at three ports 40, 42 and 44. Auxiliary ports 46 and 48 cooperate with the ports 42 and 44 to form conventional master cylinder replenishing and compensation ports. The pump is provided with fluid from the reservoir 38 via conduit 37 which extends to pump inlet 39. An end plug 50 is fixedly disposed within the bore 32 at the opening 36. A primary piston 52 is sealingly and movably disposed within the bore 32 in engagement with the end plug at interface 53 in a rest position as shown. A secondary piston 54 is movably disposed within the bore 32 between the end wall 34 and the primary piston 52 to separate a primary pressure chamber 56 from a secondary pressure chamber 58. Retraction springs 60 and 62 bias the pistons 52 and 54, respectively, to their rest positions as shown.

The primary piston 52 is provided with a cavity 64 leading to a work chamber 66 formed between the primary piston 52 and the end plug 50. A valve assembly 68 is carried within the piston cavity 64 and comprises a valve member 70 resiliently biased via spring 72 into sealing engagement with a seat 74. A snap ring 76 traps the seat 74 within the cavity 64 and a filter 78 extends between the seat 74 and a collar 80 sealingly engaging the valve member 70 which is movable relative thereto. An axially extending opening 82 extends from the left end of cavity 64 to the work chamber so that fluid pressure communicated to the latter, as described hereinafter, is also communicated to the left end of cavity 64 to pressure balance the valve member 70 within the cavity 64.

The end plug is provided with an opening to receive an input member 84 connected to the brake pedal 12 and opposing the valve member 70. A spring 86 extends from a shoulder on the input member 84 to a ring 88 which abuts a snap ring 90 on the input member 84, and the ring 88 abuts the seat 74 in the rest position to slightly space the input member 84 from the valve member 70.

The end of the bore 32 adjacent opening 36 is stepped to define a shoulder 92 intersecting port 40 and separating the bore 32 into a large diameter section 94 and a small diameter section 96. The end plug 50 is similarly stepped to carry O-ring seals 98 and 100 engaging diameter sections 94 and 96, respectively. A recess 102 on the end plug cooperates with the input member 84 to form an auxiliary chamber 104. The end plug carries a pair of U-cup seals 99 and 101 at opposite ends of the auxiliary chamber 104 to seal the auxiliary chamber from the work chamber and the outside environment.

The U-cup seals provide substantially frictionless engagement with the input member to permit free movement of the latter.

In order to communicate fluid through the brake booster 14, an inlet 106 communicates the conduit 22 with a spacing 108 formed by the primary piston 52 within the bore 32. At least one radial passage 110 on the primary piston extends from the cavity 64 to the spacing 108. Consequently, fluid pressure from the accumulator 20 is communicated to the cavity 64 to the left of seat 74 and to the right of collar 80. The diameter of the seat 74 at its engagement with valve member 70 is the same as the diameter of the valve member at the collar 80 so that the valve member is pressure balanced. In the rest position illustrated, the work chamber 66 communicates with a first axially extending passage 112 within the input member 84 which terminates in radial passages 114 opening to the auxiliary chamber 104. A second passage 116 within the end plug extends from the auxiliary chamber 104 to the bore 32 adjacent shoulder 92, and the port 40 forms a third passage communicating the bore 32 with the reservoir 38. Therefore, the work chamber 66 is in communication with the reservoir in the rest position.

During a brake application, the vehicle operator steps on the pedal 12 to move the input member 84 into the bore 32. The left end of the input member 84 engages the valve member 70 to close passage 112 so that the work chamber 66 is no longer communicating with the reservoir. Further movement of the input member 84 unseats the valve member from the seat 74 so that fluid pressure surrounding the valve member 70 is communicated to the work chamber and also to the left end of the valve member. Fluid pressure in the work chamber 66 biases the primary piston 52 to move leftwardly to contract spring 60 and close port 42, thereby generating fluid pressure in the primary pressure chamber 56. The fluid pressure in chamber 56 together with the contracted spring 60 biases the secondary piston 54 to move leftwardly, closing port 44 and generating fluid pressure in the secondary pressure chamber 58. The fluid pressure in each chamber 56, 58 is communicted, respectively, to the brake circuits 16 and 18 to effectuate braking.

As the primary piston 52 moves an incremental distance in response to separation of the valve member from the seat 74, the seat is carried by the primary piston to again contact the valve member so that further braking will require further movement of the input member 84.

Upon termination of braking, the vehicle operator releases the pedal 12 so that the retraction springs 60 and 62 and the springs 72 and 86 bias their associated parts to return to their rest positions. First, the input member 84 and the valve member 70 move relative to the primary piston 52 to contact the valve member with the seat 74 and separate the input member 84 from the valve member. Fluid pressure within the work chamber is communicated to the reservoir 38 via passages 112 and 114, auxiliary chamber 104, passage 116, bore 32, and passage 40. With the fluid pressure in the work chamber decreasing, the springs 60 and 62 will bias the primary piston and the secondary piston to move toward the end plug to retract to their rest positions. Consequently, fluid pressure in the brake circuits is decreased to terminate the brake application.

If fluid pressure communicated to the work chamber 66 leaks past seal 99, the leakage communicates with the auxiliary chamber 104 and is returned to the reservoir via passage 116, bore 32 and passage 40.

In view of the foregoing description, it is seen that the end plug provides fluid communication between the work chamber and the reservoir in the absence of a fluid passage through the primary piston. In addition, the housing bore is stepped to define the shoulder intersecting the passage 40. Consequently, it is possible to drill the passage from the open end of the bore 32 with the shoulder locating the drill bit.

I claim:

1. A brake booster having a housing with a bore therein, a piston movably disposed within the bore and cooperating therewith to partially define a pressure chamber communicating with a brake circuit and with a reservoir in a rest position, a valve assembly carried by the piston to move therewith within the bore, an end plug substantially closing one end of the bore and cooperating with the piston to define a work chamber therebetween, and an input member extending through the end plug to cooperate with the valve assembly, the input member being normally spaced from the valve assembly in the rest position and engageable therewith in an actuated position to open the valve assembly to communicate fluid pressure to the work chamber whereby the piston is moved to generate fluid pressure in the pressure chamber for communication with the brake circuit, characterized by said input member cooperating with said end plug to define an auxiliary chamber, said input member including a first passage communicating the work chamber with the auxiliary chamber in the rest position, said end plug including a second passage communicating the auxiliary chamber with said housing bore, said housing including a third passage extending from said housing bore to said reservoir to communicate said work chamber with said reservoir in the rest position via said first, second and third passages, and said end plug including a first pair of sealing rings on opposite sides of said second passage cooperating with said housing bore whereby the communication from said work chamber to said reservoir is independent of said piston.

2. The brake booster of claim 1 in which said bore defines a shoulder substantially adjacent said end plug to separate said housing bore into a small diameter section and a large diameter section, and said end plug sealingly engages both said sections.

3. The brake booster of claim 1 in which said bore defines a shoulder separating said housing bore into a small diameter section and a large diameter section, said third passage intersecting said shoulder and extending therefrom to said reservoir.

4. The brake booster of claim 1 in which said end plug carries a second pair of sealing rings engaging said input member substantially at opposite ends of said auxiliary chamber.

5. The brake booster of claim 4 in which said first pair of sealing rings comprise O-ring seals in fixed engagement with said housing bore wall and said second pair of sealing rings comprise U-cup seals providing for substantially frictionless movement of said input member during a brake application.

6. A brake booster comprising, in combination, a housing having a bore therein, a primary piston movably disposed within said bore, a secondary piston movably disposed therein and cooperating with said primary piston to define a primary pressure chamber, said secondary piston cooperating with said housing to define a secondary pressure chamber, said chambers communicating respectively with a pair of brake assemblies via housing outlets and separate brake circuits, an end plug fixedly disposed within said bore and cooperating with said primary piston to define a work chamber therebetween, a valve assembly carried by said primary piston for movement therewith during a brake application, an input member extending through said end plug and cooperating with said valve assembly to control communication of fluid pressure from a pressure source via a housing inlet to said work chamber during the brake application, the fluid pressure in said work chamber biasing said primary piston to move in said bore to generate fluid pressure in said primary pressure chamber which, in turn, biases said secondary piston to move in said bore to generate fluid pressure in said secondary pressure chamber, said valve assembly moving with said primary piston during the brake application so that said input member is movable within said housing bore during the brake application to continue communication of fluid pressure to said work chamber via said valve assembly and housing inlet after initial input member movement, and said input member, end plug and housing cooperating to define a fluid path communicating said work chamber with a reservoir for said pressure source in a rest position for the brake booster.

7. The brake booster of claim 6 in which said housing bore is stepped to define a shoulder separating a small diameter section from a large diameter section substantially at said end plug and said fluid path intersects said shoulder whereby said shoulder is easily accessible in the absence of said end plug to permit said fluid path to be formed on said shoulder.

8. The brake booster of claim 6 in which said end plug carries a first pair of sealing means sealingly engaging said housing bore on opposite sides of said fluid path at said housing bore.

9. The brake booster of claim 8 in which one of said pair of sealing means isolates said fluid path from said primary piston.

10. The brake booster of claim 6 in which said fluid path is defined by said input member, said end plug and said housing independently of said primary piston.

* * * * *